United States Patent [19]

Kerr

[11] Patent Number: 5,042,762

[45] Date of Patent: Aug. 27, 1991

[54] COMPUTER PRINTER STAND

[76] Inventor: Gary T. Kerr, 209 Pine St., Danvers, Mass. 01923

[21] Appl. No.: 516,308

[22] Filed: Apr. 30, 1990

[51] Int. Cl.⁵ .......................................... F16M 11/00
[52] U.S. Cl. .................................. 248/176; 248/676; 400/691
[58] Field of Search ...................... 248/176, 676, 172; 211/50, 13; 400/691

[56] References Cited

U.S. PATENT DOCUMENTS

| 1,792,612 | 2/1931 | Staley | 248/676 X |
| 4,512,543 | 4/1985 | Petrick | 248/676 X |
| 4,669,691 | 6/1987 | Solomon | 248/172 X |
| 4,707,156 | 11/1987 | Clark | 248/676 X |
| 4,717,112 | 1/1988 | Pirkle | 248/676 X |

Primary Examiner—Alvin C. Chin-Shue
Attorney, Agent, or Firm—Donald N. Halgren

[57] ABSTRACT

An adjustable printer stand for supporting a computer printer, head end down, at an acute angle with respect to the horizontal, the stand having movable support arms and an articulable paper carrier which is pivotable with respect to said stand.

10 Claims, 2 Drawing Sheets

COMPUTER PRINTER STAND

BACKGROUND OF THE INVENTION (1) Field of The Invention

This invention relates to computers and more particularly to stands or frames for supporting computer printers.

(2) Prior Art

Computers and their peripheral equipment have become universal over the past generation. The number of products has grown exponentially. In offices all over the world, it seems as though everyone has a computer and a printer on or near their desk. This has unfortunately taken up a lot of space on the user's desk, or it has made it somewhat inconvenient to keep an eye on the computer and oversee the printer output at the same time.

One approach to making a desktop system more space efficient is to reduce the size of the components. Printers are limited to a particular minimum size because they operate on a particular size of paper.

Murphy U.S. Pat. No. 4,570,802 shows a printer stand which supports a printer at an angle of from 45 degrees to 60 degrees from the horizontal. This stand permits only a particular printer for which the stand is made, to receive paper from a bracket behind the printer, to feed up and over the back of the printer, and to deposit the printed pages in a folded manner behind the printer and printer stand. It however, does not really minimize the footprint of the printer nor permit the head of the printer to be disposed downwardly as well as allowing easy surveillance of the paper output.

Mueller U.S. Pat. No. 4,544,065 shows an inclined printer stand, however it suffers from the drawbacks of the Murphy printer. That is, it does not minimize the footprint while still allowing easy manipulable control over the output of paper therefrom.

Gauss U.S. Pat. No. 4,880,202 shows an inclined printer stand for changing the direction of the center of gravity, but does not take advantage of the minimizing of its footprint.

A further printer stand is shown in Chang U.S. Pat. No. 4,722,506, wherein a large frame holds a supply of paper for the printer and receives the printed paper, fan folded thereunder. This printer also fails to minimize the footprint of the stand, or allow easy access to the paper as it comes off of the printer.

It is an object of the present invention to provide an adjustable stand which will accept most any type of impact printer, with a minimum footprint, while allowing easy viewing and control of the paper output of the printer, immediately in front of the printer.

BRIEF SUMMARY OF THE INVENTION

The present invention comprises a printer stand which is adjustable so as to receive a wide variety of impact type printers with a minimum footprint permitting utilization on a desk, adjacent its computer.

The space saving stand comprises a base frame having a pair of generally parallel spaced apart feet of a particular limited length. Each of the spaced apart feet has a rearwardly angularly disposed leg extending at a mid-point thereat, arranged at an angle of about 60 degrees to about 90 degrees, preferably about 72 degrees from the horizontal. The legs are connected to one another by a main bar extending horizontally between their distalmost ends. The main bar is of rectangular cross-section, having a groove extending along a lowermost edge on its rearwardly directed side. The main bar lies in the plane defined by the angularly disposed legs.

A pair of support arms are slidably disposed across the main bar. Each support arm is of generally "L" shape, and is comprised of a lowermost support segment directed forwardly from the main bar, and a upwardly directed support segment, which defines a plane parallel to and generally adjacent the plane defined by the legs. A downwardly directed finger extends from the rearward side of each upwardly directed support segment. A dimple projects forwardly from the forward side of the distal end of the downwardly directed finger. Each dimple mates with the groove disposed in main bar to provide stability between the support arm and the bar. The outer rearward side of the upward support leg and the rearward side of the downwardly directed finger as well as the lower side of the forward support segment comprise a plurality of longitudinally extending ribs molded into the support arm for strength and rigidity thereof and to permit the stand to bear heavy printers.

A pivotable paper carrier is attachable over the upper edge of the main bar, so as to articulably hang adjacent the rear face thereof. The pivotable paper carrier comprises a back panel and a lower panel, joined along a lowermost edge, to define in cross-section, an "L" shape. A bracket extends from the mid-point of each side of the back panel, which brackets are connected by a cross brace. A gripping bracket is disposed on the forwardly directed side of the cross-brace. The gripping bracket is a channel of generally inverted U-shape, having a bead projecting part way across the opening of the channel. The opening is wide enough to fit over the top of the main bar and to permit mating therewith. The bead extending along one side of the gripping bracket maintains the snugness of the attachment of the paper carrier to the main bar, and permits the paper carrier to pivot slightly on the main bar, allowing the printer stand to be pushed close to a wall, so as to further minimize the footprint of the printer stand, because the paper carrier may be thereby forced into a more vertical orientation, than if it were hanging into the main bar without the paper carrier being pushed against a wall. Also, the paper carrier is adjustable and removable to allow various pre-printed forms to be aligned with the printers forms tractor.

BRIEF DESCRIPTION OF THE DRAWINGS

The objects and advantages of the invention will become more apparent when in conjunction with the following drawings, in which.

DESCRIPTION OF THE PREFERRED EMBODIMENT

Figure 1:
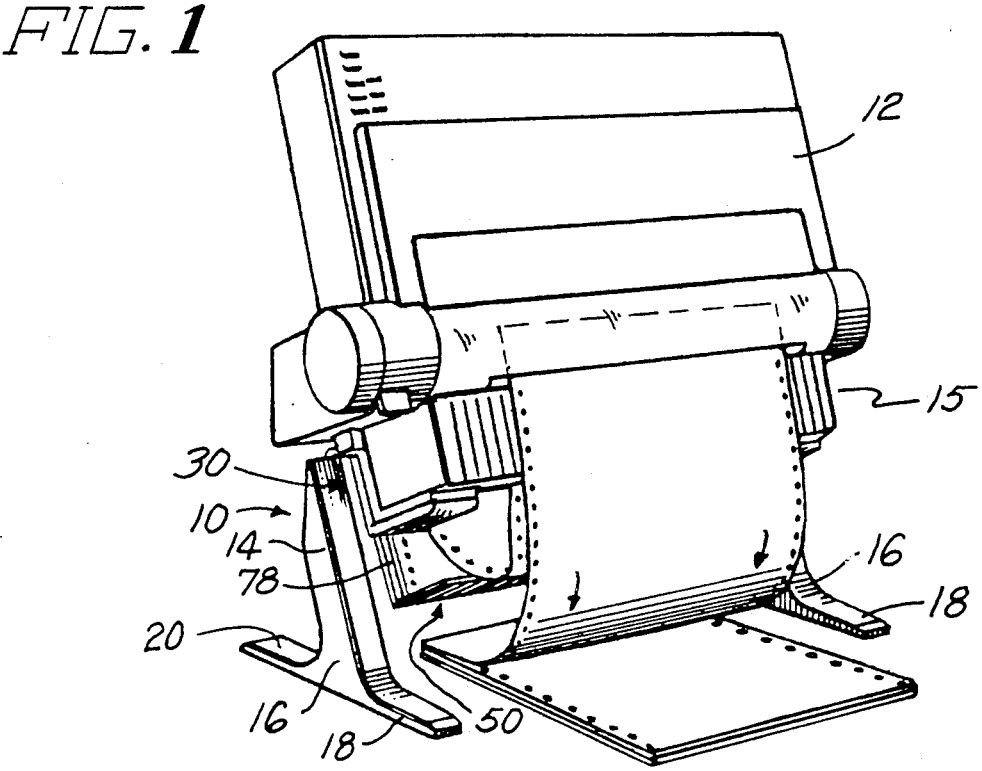
FIG. 1 is a perspective view of the printer stand of the present invention, supporting a printer and paper carrier.

Referring to the drawings in detail, and particularly to FIG. 1, there is shown a space saving printer stand 10 having an exemplary printer 12 mounted thereon, the printer 12 having its heaviest printer head end 15 directed downwardly.

The printer stand 10 comprises a base frame 14 comprised of a pair of generally parallel spaced apart feet 16, having a forward portion 18 and a rearward portion 20. A leg 22 is disposed from approximately the midpoint on each of the feet 16. Each leg 22 is disposed at an angle "A" with respect to each foot 16, the angle A being from about 60 degrees to about 90 degrees, preferably about 72 degrees from the horizontal as may be seen in FIGS. 2 or 6.

Figure 2:
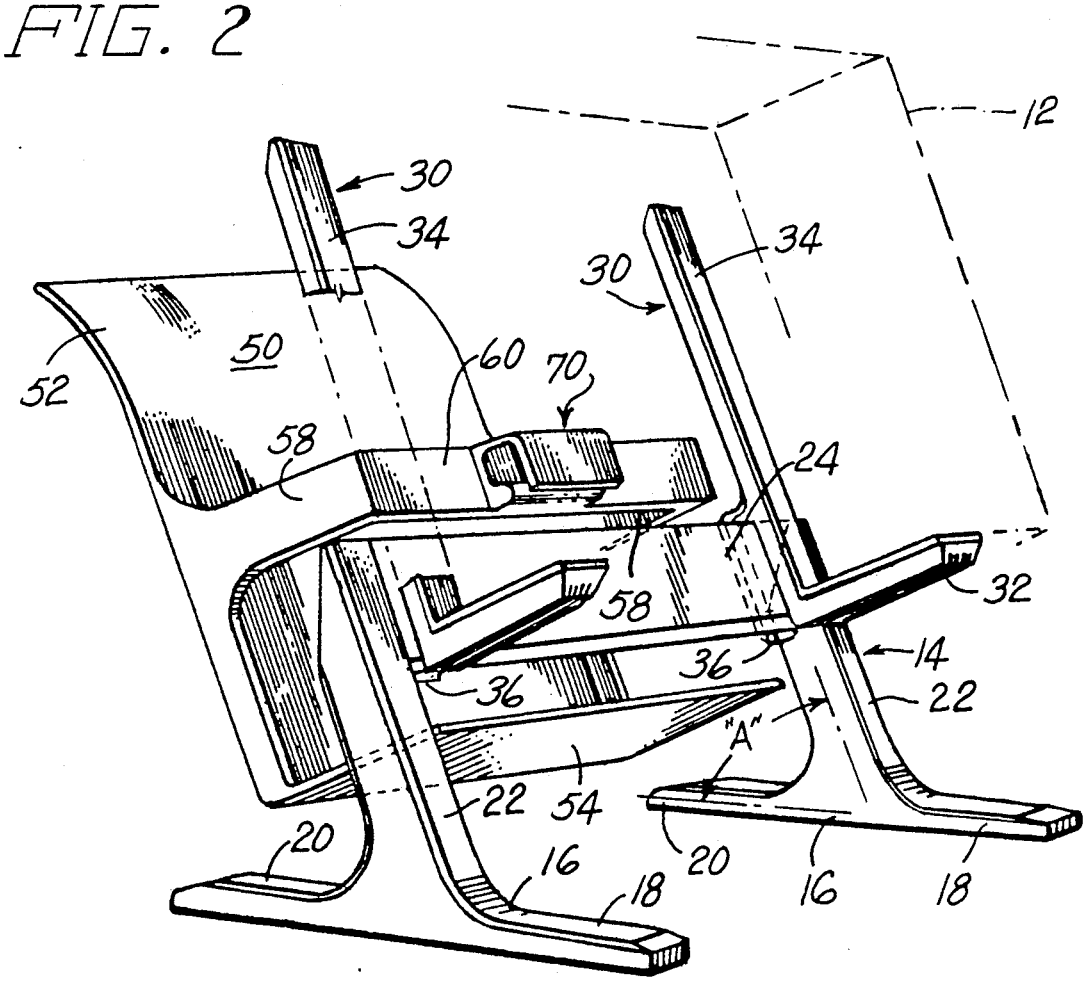
FIG. 2 is an exploded perspective view of the printer stand and paper carrier, with an outline of a printer partially shown in phantom.
Figure 6:
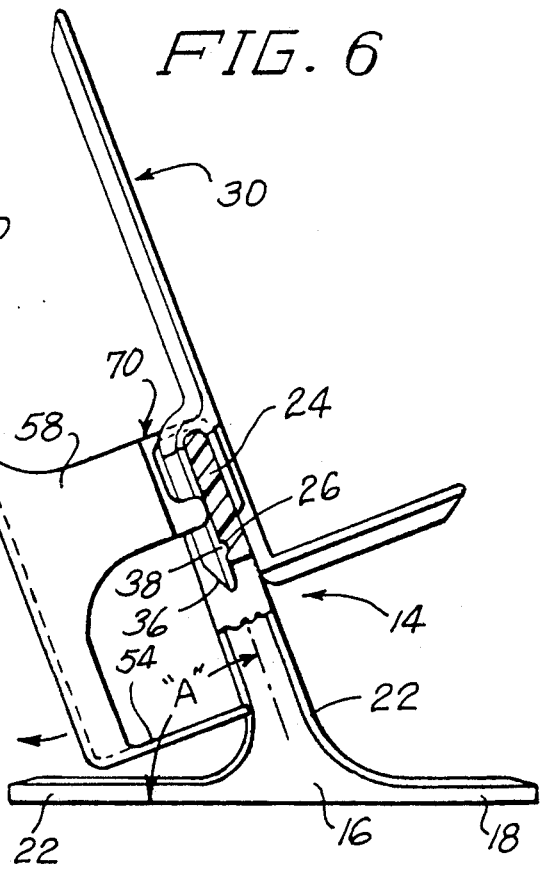
FIG. 6 is a side elevational view of the paper carrier mounted onto the base of the printer stand, with portions shown cut-away for clarity.

The legs 22 are connected to one another, to comprise the base frame 14, by a horizontally disposed main bar 24, arranged between the distalmost portion of each of the legs 22, as shown in FIG. 2. The main bar 24 is of rectangular cross-section, as may be seen in cut-away, in FIG. 6. At least one groove 26, as also seen in FIG. 6, is disposed in the rearwardly disposed face of the main bar 24, longitudinally adjacent the lower most edge thereof. The main bar 24 lies generally in the plane defined by the angularly disposed legs 22.

Figure 4:
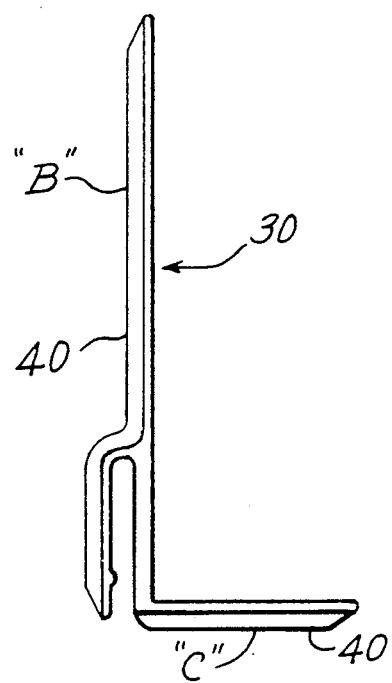
FIG. 4 is an elevational view of the side of the support arm shown as FIG. 3.

A pair of support arms 30 are slidably disposed across the main bar 24, as shown in FIG. 2. Each support arm 30 is of generally "L" shape, as may be seen most clearly in FIG. 4. Each support arm 30 is comprised of a lowermost support segment 32 directed forwardly from the main bar 24, and an upwardly directed support segment 34; as shown in FIGS. 2, 4 and 6. The upwardly directed support segments 34 generally define a plane parallel to and adjacent the plane defined by the legs 22. The upper and lower support segments 34 and 32 may have a non-slip surface, not shown, disposed thereon.

Figure 3:
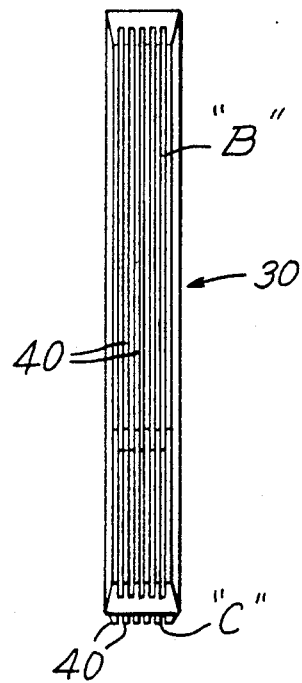
FIG. 3 is an elevational view of the rear of a support arm of the printer stand.

A downwardly directed finger 36 extends from the rearward side "B" of each upwardly directed support segment 34, as shown in FIGS. 3 and 4. At least one dimple 38 projects forwardly from the forward side of the distal end of each downwardly directed finger 36. Each dimple 38 mates with its respective groove 26 in the rearwardly directed side of the main bar 24, to facilitate the security therebetween, when a printer 12 is placed onto the support arms 30. The main bar 24 mates into the space defined by the bifurcation of the finger 36 and the upwardly directed support segment 34, thus creating its load bearing ability with respect to the base frame 14. The outer rearward side "B" of the upward support segment 34, and the outer lower side "C" of the lower support segments 32 each have a plurality of longitudinally extending ribs 40, shown most clearly in FIG. 3, and partially in FIG. 4, which are molded into the support arms 30, to provide strength and rigidity thereto. It is to be noted at this point, that the support arms 30, as well as the base frame 14, are preferably made from injection molded plastic, while they could however be made from other suitable materials.

A pivotable paper carrier 50, is attachable over the upper edge of the main bar 24, at its mid-point thereof, so as to articulably hang adjacent the rear face thereof, as shown in FIGS. 2 and 6. The pivotable paper carrier 50 comprises an elongated back panel 52 and short lower panel 54, joined along a lowermost edge 56, to generally define an "L" in cross-section, as may be seen in FIG. 5. A bracket 58 extends from the approximate midpoint of each side of the back panel 52, each bracket 58 being connected by a cross brace 60, as best shown in FIG. 2.

Figure 5:
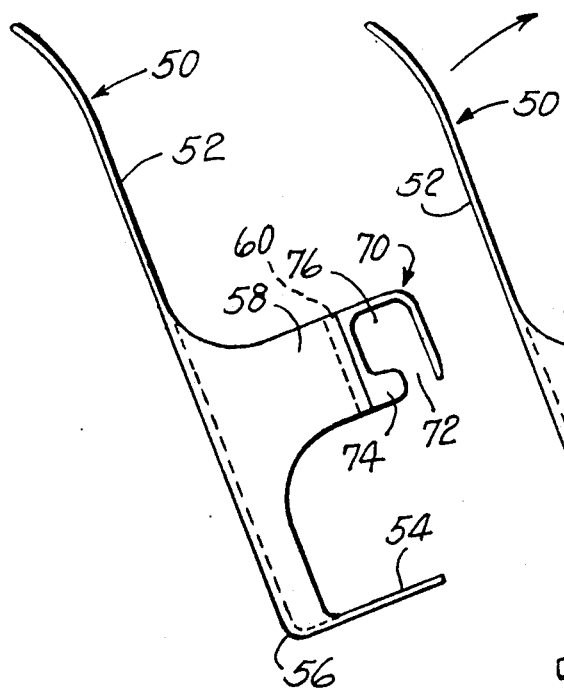
FIG. 5 is a side elevational view of the paper carrier.

A gripping bracket 70 is disposed on the forwardly directed side of the cross brace 60, as shown most clearly in FIGS. 2 and 5. The gripping bracket 70 is a generally inverted U-shaped channel, having a longitudinally directed gap 72 which is arranged to receive the main bar 24. A longitudinally directed bead 74 is disposed along the rearward edge of the bracket 70, to maintain the snugness of the bracket 70 onto the main bar 24 for its support, while also defining a pivot space 76, into which the upper portion of the main bar 24 may mate, when the paper carrier 50 is pivoted clockwise when viewing FIG. 6 as indicated by the arrows "D". The pivoting of the paper carrier 50, permits the printer stand 10 along with its attendant paper carrier 50, to be positioned close to a wall, thus bringing the distal edge of the elongated back panel 52 closer to the top, distal ends of the support arms 30.

Fan folded paper 78, such as that shown in FIG. 1, is supported in the paper carrier 50, and fed down beneath the almost vertically disposed printer 12. The paper 78 thus enters the printer 12 and travels around the printer roll, not shown, from the bottom side thereof. The paper 78, as it evolves from the printer 12, falls downwardly and folds itself, as shown in FIG. 1, onto the desk or table between the feet 16 of the base frame 14, for easy manipulation and receipt by the computer/printer operator.

Thus there has been shown a printer stand which has support arms that are movable transversely to receivably support a wide range of printers, the printer stand including a pivotable space saving paper carrier which supplies paper to the printer from a location adjacent the bottom-side of the printer, the printer being disposed in an orientation which is very functional, while minimizing the footprint or desk space that the unit utilizes. The center of gravity is low and directed through the legs of the base frame to maximize stability, and the paper output is presented to the operator where it is readily reviewable and comports well with the space minimizing characteristics of this printer stand invention.

What is claimed is:

1. An adjustable printer stand for supporting a computer printer at an inclined angle, to minimize the footprint of the printer stand/printer assembly on a desktop while permitting easy operator access to paper printed by said printer, comprising;

a base frame;
   a printer support means movably arranged onto said base frame to permit said printer stand to support any of a variety of printer sizes;
   said base frame comprising a pair of generally parallel spaced apart legs each secured to a horizontally disposed support bar immovable with respect to said legs;
   said support means comprising a pair of support arms disposed on said support bar, said arms moveable with respect to said support bar and one another;
   each of said support arms being bifurcated by an elongated finger disposed off of the rearwardly directed side thereof, so as to permit said support arm to adjustably mate with said immovable support bar.

2. An adjustable printer stand as recited in claim 1, wherein said legs are arranged at an angle of about 60 to about 90 degrees with respect to the horizontal, preferably about 72 degrees.

3. An adjustable printer stand as recited in claim 1 wherein said legs have a pair of feet at their lowermost ends.

4. An adjustable printer stand as recited in claim 1, wherein said support bar has a groove along a rear side thereof, to facilitate securement of said support arms therewith.

5. An adjustable printer stand as recited in claim 1 wherein said finger has a dimple near its distalmost end, said dimple being registerable in said groove on said support bar, for alignment and securement therewith.

6. An adjustable printer stand as recited in claim 1, wherein said support arms and said base frame are made from an injection moldable plastic material.

7. An adjustable printer stand as recited in claim 6, wherein said support arms have a plurality of longitudinally extending ribs defining one side thereof, to provide strength thereto.

8. An adjustable printer stand for supporting a computer printer at an inclined angle, to minimize the footprint of the printer stand/printer assembly on a desktop while permitting easy operator access to paper printed by said printer comprising:
- a base frame;
- a printer support means movably arranged onto said base from to permit said printer stand to support any of a variety of printer sizes;
- said base frame comprising of a pair of generally parallel spaced apart legs each secured to a horizontally disposed support bar immovable with respect to said legs;
- an articulable paper carrier mountable on the rear side of said immovable support bar;
- said paper carrier defined by a back panel and a lower panel which is attachable to said immovable support bar by a gripping bracket;
- said gripping bracket comprising an inverted U-shaped channel member having a pivot space therein, to permit said paper carrier to be pivotable on said support bar, with respect to said base frame, thus permitting said base frame to be moved close to a wall, said paper carrier having the upper portion of its back panel to be swingable towards its printer, minimizing the footprint of said printer stand.

9. An adjustable printer stand having a front and a rear, capable of supporting a wide variety of computer printers at an inclined angle, with the head of the printer directed downwardly, to minimize the footprint of said printer stand, to lower the center of gravity of any printer thereon, and to permit access to any printed paper generated, to an operator of said printer, comprising:
- a base frame arranged at an acute angle with respect to the horizontal;
- a printer support means attached to and movable with respect to said base frame; and
- a paper carrier supported on said base frame and articulable with respect thereto to permit said printer to receive paper from the bottom thereof and to generate printed paper in the direction towards the front of the printer stand;
- said support means comprising a pair of L-shaped support arms which are slidable on said base frame;
- a printer supported on said support arms being held at an angle of about 60 to 90 degrees, preferably about 72 degrees with respect to the horizontal;
- said support arm having a finger extending rearwardly therefrom, defining a bifurcation which mates with said base frame and has engagement means therebetween.

10. An adjustable printer stand having a front and a rear, capable of supporting a wide variety of computer printers at an inclined angle, with the head of the printer directed downwardly, to minimize the footprint of said printer stand, to lower the center of gravity of any printer thereon, and to permit access to any printed paper generated, to an operator of said printer, comprising:
- a base frame arranged at an acute angle with respect to the horizontal;
- a printer support means attached to and movable with respect to said base frame; and
- a paper carrier supported on said base frame and articulable with respect thereto to permit said printer to receive paper from the bottom thereof and to generate printed paper in the direction towards the front of the printer stand;
- said paper carrier having a rear panel and a lower panel connected along a lowermost edge to define an "L" shape in cross-section, said rear and lower panels having a frame which has a bracket thereon, for attachment to said base frame, said bracket having a space therein, to permit said rear and lower panels to pivot with respect to said base frame.

* * * * *